United States Patent [19]

Klinger

[11] 4,378,046

[45] Mar. 29, 1983

[54] PROTECTIVE DEVICE FOR HEAT EMITTING STRUCTURES

[75] Inventor: Wilhelm Klinger, Munich, Fed. Rep. of Germany

[73] Assignee: Süddeutsche Bremsen A.G., Munich, Fed. Rep. of Germany

[21] Appl. No.: 126,004

[22] Filed: Feb. 29, 1980

[30] Foreign Application Priority Data

Feb. 28, 1979 [DE] Fed. Rep. of Germany ....... 2907767

[51] Int. Cl.³ .......................... F28F 13/00; F28F 3/14
[52] U.S. Cl. ..................................... 165/51; 165/135; 165/170; 60/321
[58] Field of Search ..................... 165/154, 164 S, 170, 165/51, 52, 134, 135; 60/320, 321; 123/198 D

[56] References Cited

U.S. PATENT DOCUMENTS

| | | | |
|---|---|---|---|
| 1,518,669 | 12/1924 | Nash | 165/52 |
| 2,024,521 | 12/1935 | Harrison | 165/170 |
| 2,481,511 | 9/1949 | Hubbell | 165/170 |
| 2,494,947 | 1/1950 | Kuttner | 60/321 |
| 2,768,508 | 10/1956 | Guyton | 165/170 X |
| 2,894,265 | 7/1959 | Reardin | 165/51 X |
| 4,179,884 | 12/1979 | Koeslim | 60/321 |
| 4,273,080 | 6/1981 | Pluequet | 60/321 |

Primary Examiner—William R. Cline
Assistant Examiner—Theophil W. Streule, Jr.
Attorney, Agent, or Firm—Edmund M. Jaskiewicz

[57] ABSTRACT

A protective device is provided for heat emitting structures including but not limited to exhaust manifolds for internal combustion engines. A protective device comprises a double-wall protective screen consisting of two metal sheets which are spaced apart and substantially parallel. The space between the metal sheets is bridged over to support these sheets against each other. The sheets are sealingly connected along their edges so that they enclose between the support points at least one coolant space connected to at least one coolant connection arranged on the edge of the protective screen.

20 Claims, 42 Drawing Figures

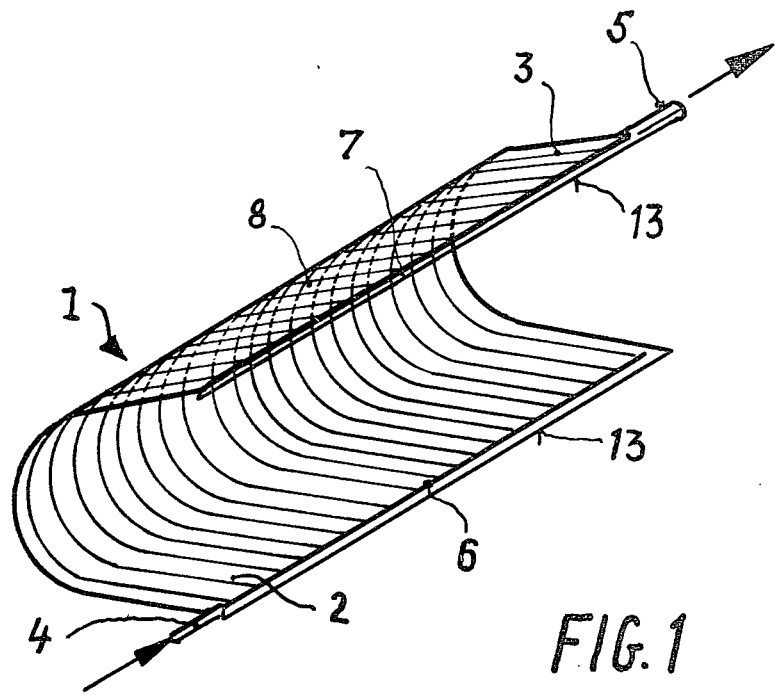
FIG. 1
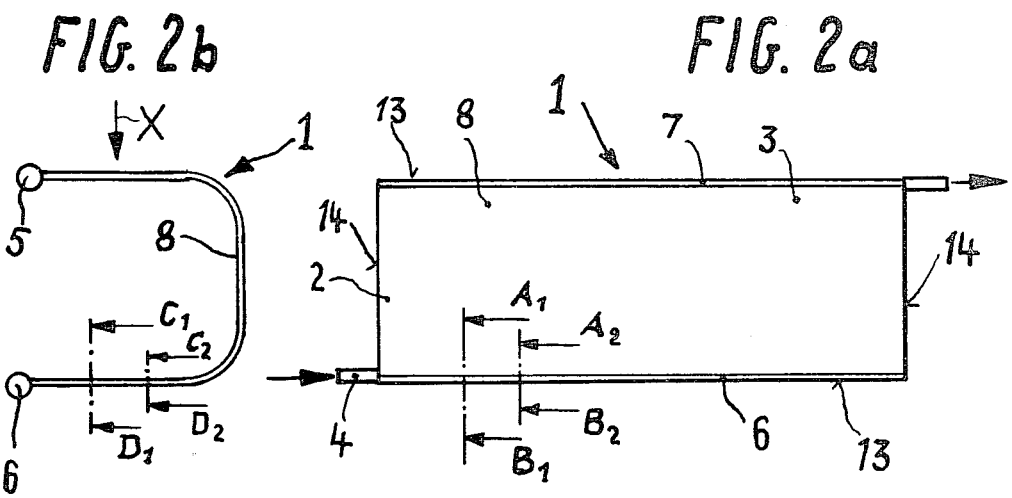
FIG. 2b
FIG. 2a

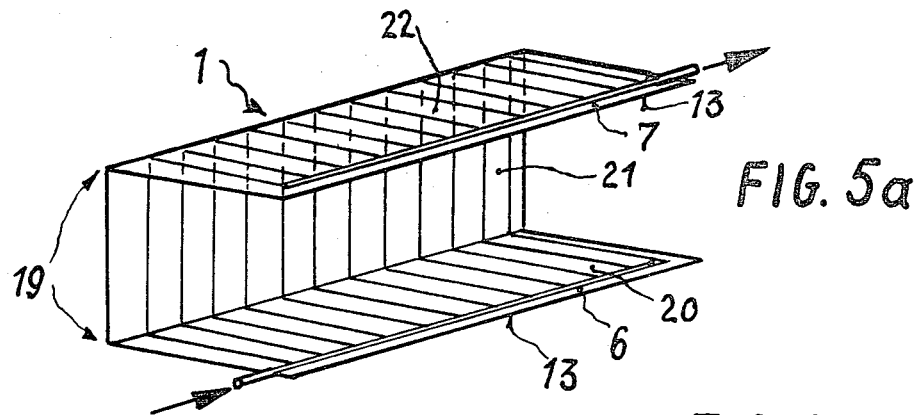
FIG. 5a
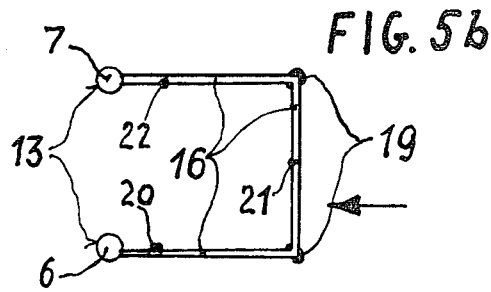
FIG. 5b
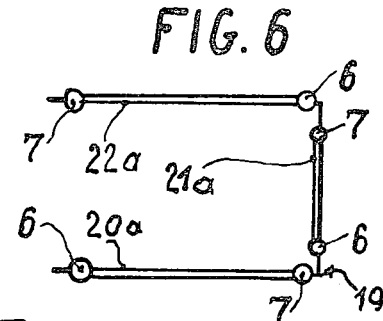
FIG. 6
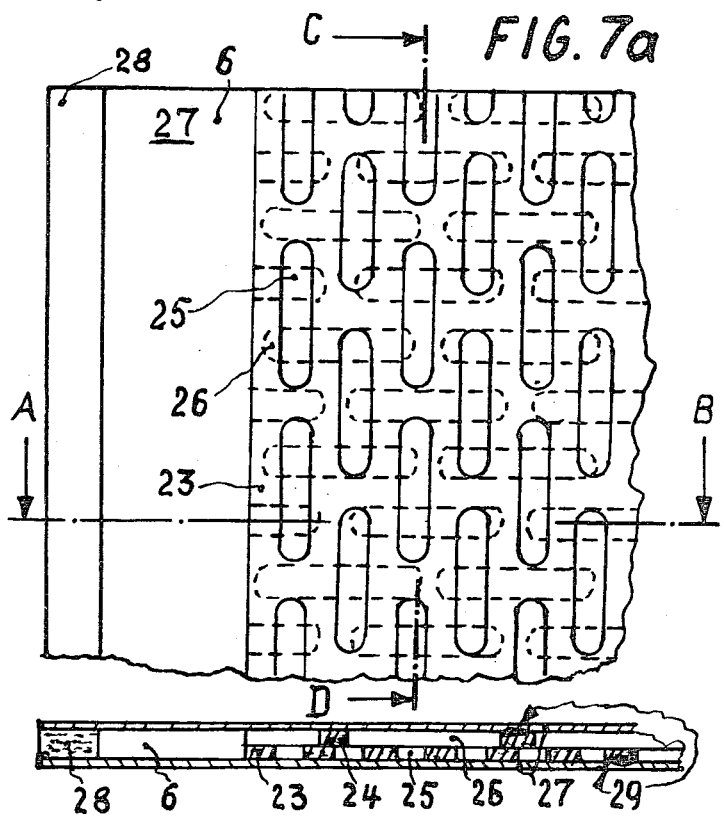
FIG. 7a
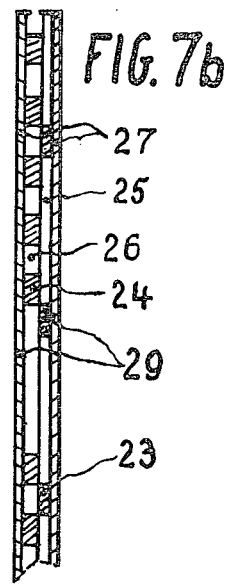
FIG. 7b
FIG. 7c

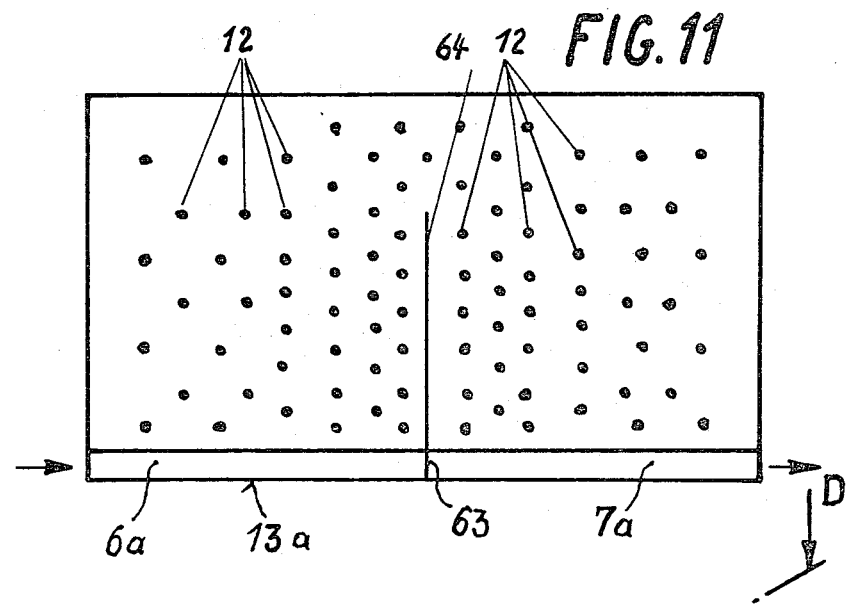
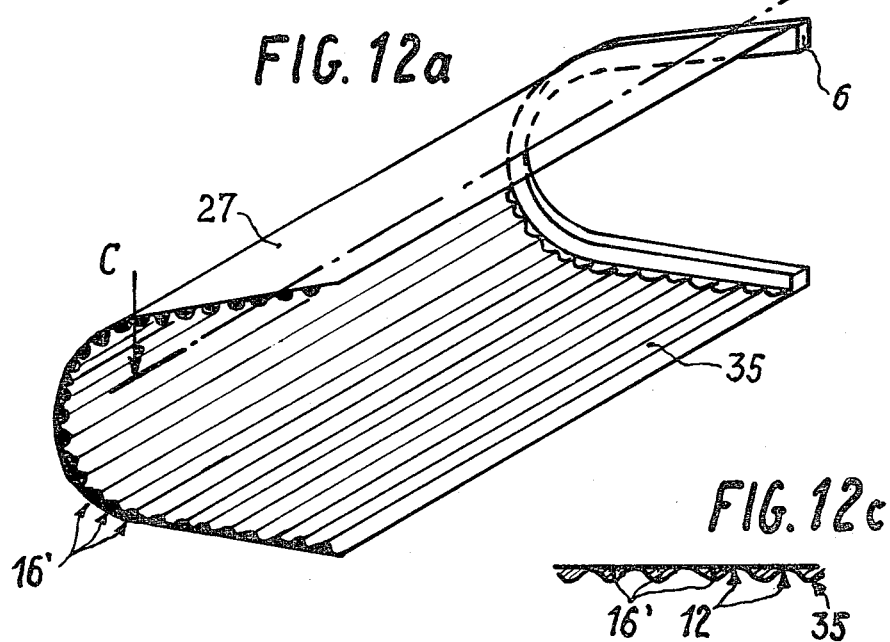
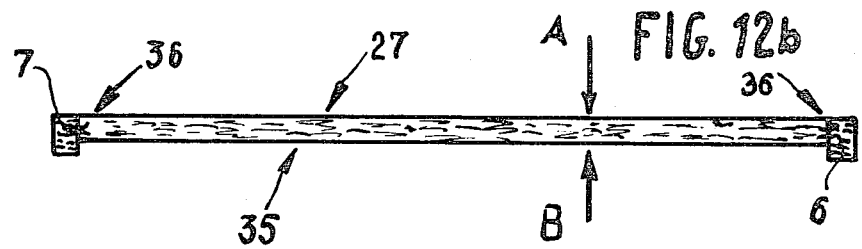

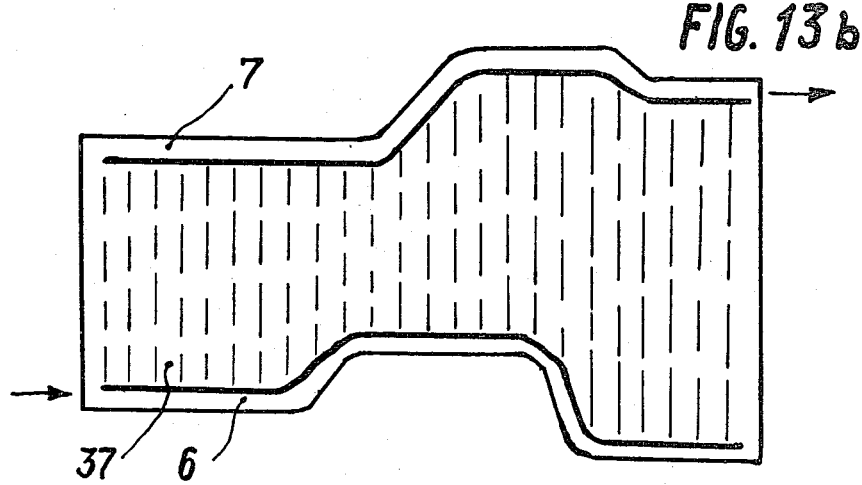
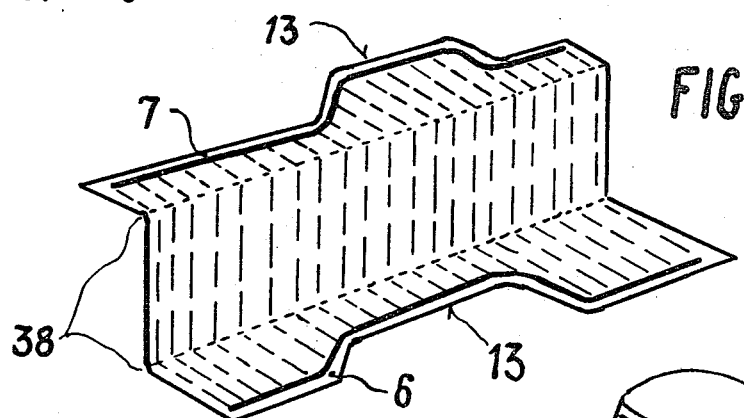
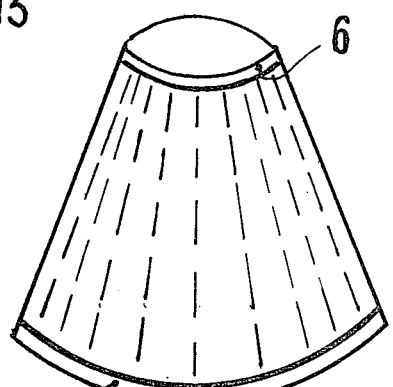
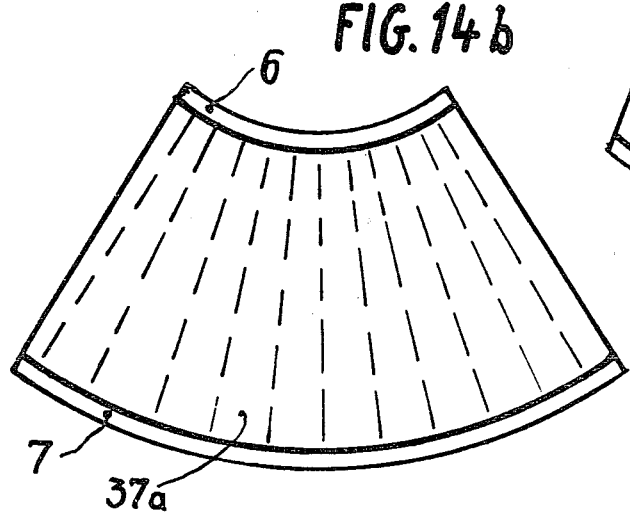

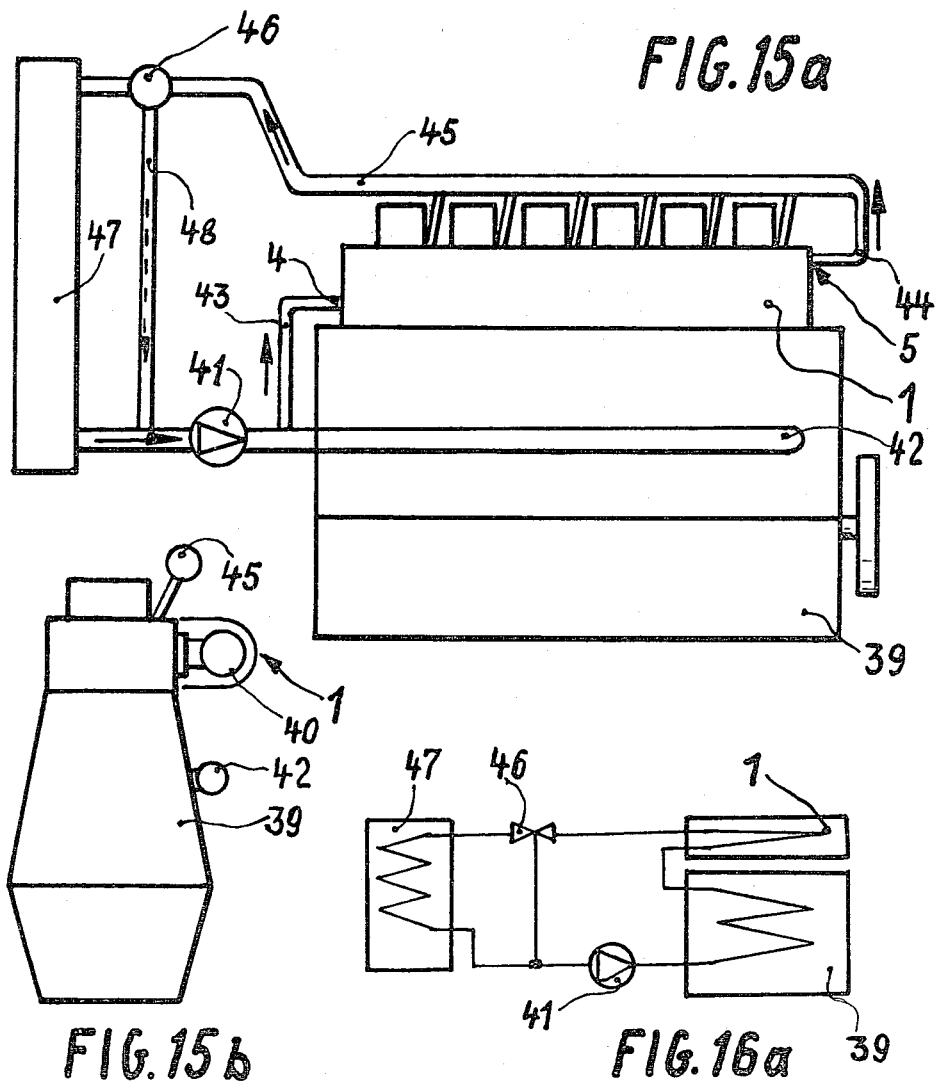
FIG. 15a
FIG. 15b
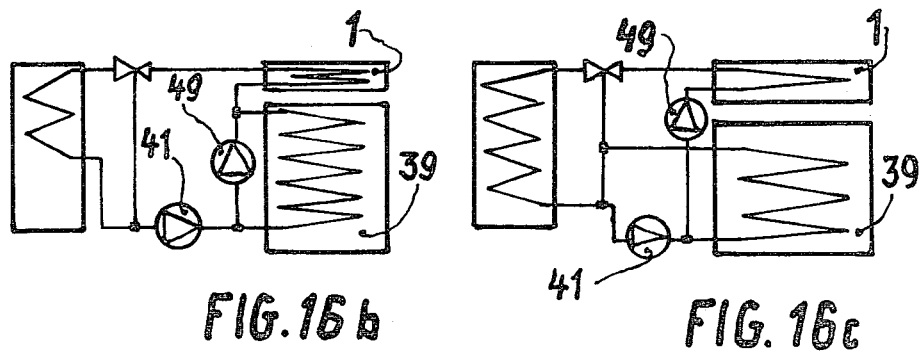
FIG. 16a
FIG. 16b
FIG. 16c

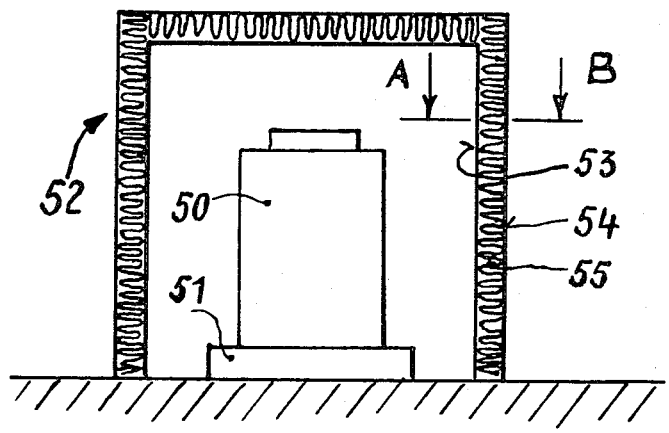
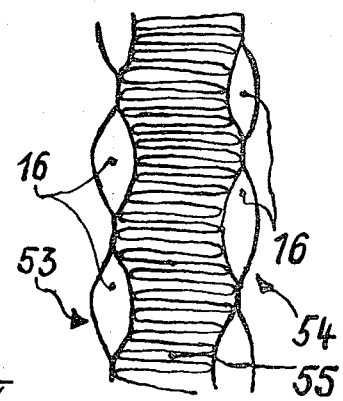
FIG. 17a  FIG. 17b
FIG. 18a
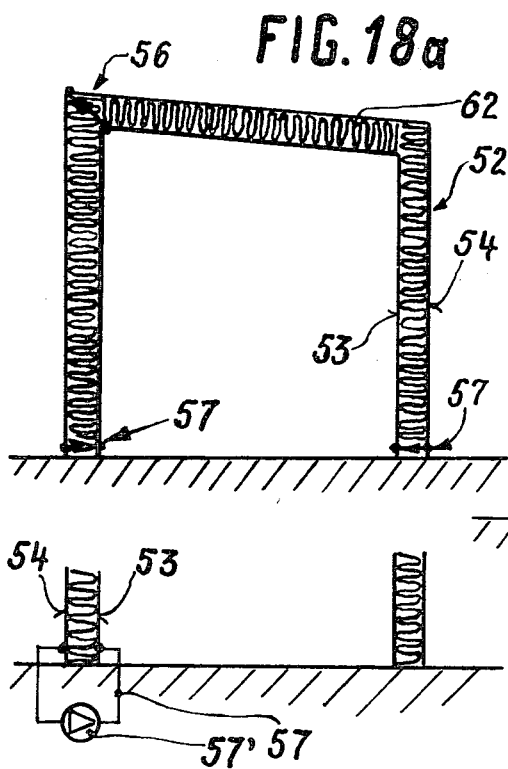
FIG. 18c
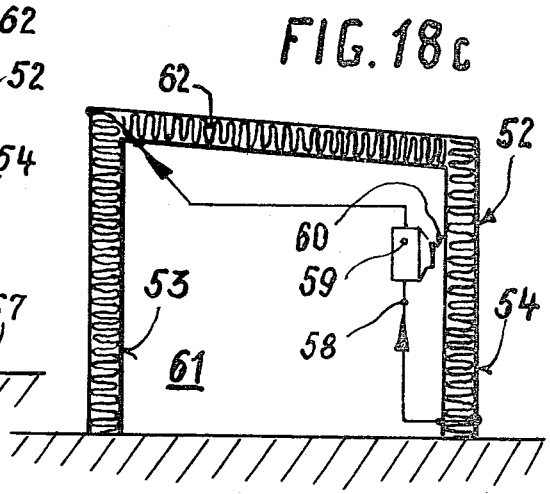
FIG. 18b
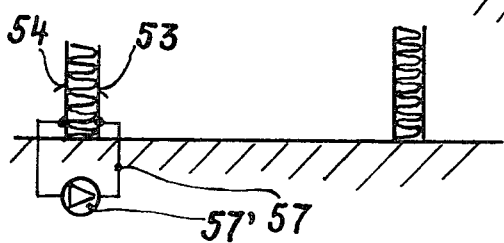

PROTECTIVE DEVICE FOR HEAT EMITTING STRUCTURES

The present invention relates to a protective device for heat emitting structures including but not limited to exhaust pipes and manifolds for internal combustion engines, more particularly, to such a protective device having two spaced substantially parallel metal sheets with the space between them being bridged by a plurality of support points.

Various forms of structures have been devised to provide protection against hot exhaust pipes and exhaust manifolds of internal combustion engines from being contacted by persons. The exhaust pipes and manifolds have been insulated with suitable insulating material such as asbestos or mineral wool. The exhaust pipes may be wrapped or covered with a sleeve of insulating material which may be treated with a suitable chemical binder in order to strengthen and harden the insulating material. The insulating protection can further be wrapped with wire or wire netting or can be enclosed in sheet metal shells or covers. The sheet metal shells must be connected and fastened together by means of screw connections, welds or riveting. Such devices for protecting against contact have been mounted over the insulation at a pretermined space therefrom. It thus becomes expensive to apply and install the insulating material and the insulating material cannot be installed at all possible applications. Further, these protective devices have been known to become distorted because of the high heat radiation at uninsulated spots.

A further problem with such known insulating structures is that since the exhaust gas temperatures are at temperatures of about 600°–700° C. but the permissible long-term temperature of asbestos is only about 430° C., there is a danger of thermally overstressing the asbestos. The use of mineral wool in place of asbestos is expensive. In addition, various environmental and pollution problems arise from the use of asbestos. Also, these known insulating materials can become brittle because of the vibrations produced by the engine and after long period of operation the insulating material can fail.

It is generally sought to limit the temperature on the exterior of the insulating structures to a maximum of about 120° C. This limit cannot be economically attained over long operating periods with the insulating materials as described above.

It has also been proposed to use various forms of cooling structures for exhaust pipes, particularly for non-supercharged engines. It is not feasible to cool exhaust pipes for supercharged engines since the cooling water jacket would absorb too much heat from the exhaust gas which in turn would decrease the turbocharger efficiency. The relatively large quantity of heat must then be removed in correspondingly enlarged radiating structures. The production of such a cooling structure, which is also very heavy, is difficult and expensive since the thickness of the cooling water jacket is relatively small.

Another proposal has been to surround the exhaust pipe of an internal combustion engine with a protective structure in the form of a protective screen spaced at a given distance from the pipe and constructed as a casting with a thin space for the circulation of coolant water between the double walls. However, the manufacture of such a double-wall casting is expensive and such a protective structure requires excessive space.

It is therefore the principal object of the present invention to provide a novel and improved protective device for heat emitting structures such as exhaust pipes and manifolds of internal combustion engines.

It is another object of the present invention to provide such a protective device which is simple in structure, inexpensive to manufacture and can be mounted with a minimum of effort and labor.

It is a further object of the present invention to provide such a protective device which requires only a very small space and is light in weight.

An additional object of the present invention is to provide such a protective device which provides heat protection even against very hot exhaust pipes in continuous operation and permits a maximum surface temperature of about 120° C. to be attained without causing any appreciable exhaust gas energy loss and thus can be employed both for supercharged and non-supercharged internal combustion engines.

It is still another object of the present invention to provide such a protective device in which the coolant is heated only slightly, employs a structure which can be readily adapted and fitted to various heat emitting structures and may also be employed for high coolant pressures.

According to one aspect of the present invention a protective device for heat emitting structures may comprise a screen spaced from and at least partially enclosing a heat emitting structure. This screen comprises a pair of substantially parallel spaced metal sheets which are sealingly connected along their edges. Means are provided between the sheets for bridging space therebetween to support the sheets at a plurality of points with respect to each other so as to define at least one coolant chamber through which a coolant fluid can flow. Coolant supply and discharge connection means are provided on at least one edge of the screen so as to communicate with the coolant chamber.

Various forms of structures may be employed to bridge the space between the sheet metal sheets and to provide support points between the sheets.

Other objects and advantages of the present invention will be apparent from the accompanying description when taken in conjunction with the following drawings, which are exemplary, wherein;

FIG. 1 is an overall perspective view of a protective device according to the present invention;

FIG. 2a is a front elevational view of the protective device of FIG. 1;

FIG. 2b is an end elevational view of the protective device of FIG. 1;

FIG. 3b is a sectional view taken along the line $A_1$-$B_1$ of FIG. 3a;

FIG. 3c is a sectional view taken along the line $A_2$-$B_2$ of FIG. 3a;

FIG. 3d is a sectional view taken along the line $C_1$-$D_1$ of FIG. 3a;

FIG. 3e is a sectional view taken along the line $C_2$-$D_2$ of FIG. 3a;

FIGS. 4a through 4e are sectional views corresponding respectively to FIGS. 3b–3e;

FIG. 5a is similar to FIG. 1 and shows a perspective view of a second modification;

FIG. 5b is an end elevational view of FIG. 5a;

FIG. 6 is an end elevational view similar to that of FIG. 5b and showing a third modification;

FIG. 7a is a view similar to that of FIG. 3a of a fourth modification;

FIG. 7b is a sectional view taken along the line C–D of FIG. 7a;

FIG. 7c is a sectional view taken along the line A—A of FIG. 7a;

FIG. 11 is a top plan view of an eighth modification of the present invention;

FIG. 12a is a perspective view similar to that of FIG. 1 but of a ninth modification with a portion thereof cut away;

FIG. 12b is a sectional view taken along the line C–D of FIG. 12a;

FIG. 12c is a sectional view taken along the line A–B of FIG. 12b;

FIG. 13a is a perspective view of the protective device according to the present invention provided with a Z-shaped cross-section;

FIG. 13b is a plan view of the development of the embodiment in FIG. 13a;

FIG. 14a is a perspective view of a protective device of the present invention with a conical shape;

FIG. 14b is a plan view of the development of the protective device of FIG. 14a;

FIG. 15a is a side elevational view of an internal combustion engine having a protective device mounted thereon;

FIG. 15b is an end elevational view of FIG. 15a;

FIGS. 16a–16c show schematically various systems for circulating coolant through the protective device when employed on an internal combustion engine;

FIG. 17a shows schematically still another modification of the present invention employed to enclose an engine;

FIG. 17b is a sectional view taken along the line A–B of FIG. 17a; and

FIGS. 18a–18c are views similar to that of FIG. 17a showing still further modifications thereof.

Proceeding next to the drawings wherein like reference symbols indicate the same parts throughout the various views a specific embodiment and modifications of the present invention will be described in detail.

Figure 3A:
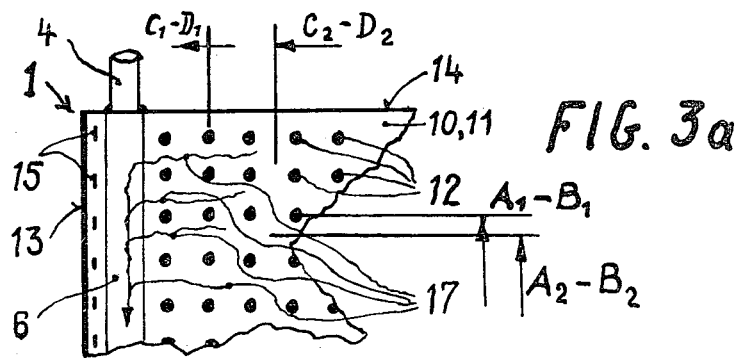
FIG. 3a is a plan view of a portion of one embodiment of the protective device in enlarged scale.

In FIG. 1 there is illustrated a protective device 1 having a cross-sectional shape similar to that of half of an ellipse cut along its minor axis. The heat emitting structure which is to be protected by the device 1 is not illustrated but may have an elongated form and is preferably positioned coaxially of the protective device 1 such that the device encloses the heat emitting structure like a protective screen with a space between the screen and the heat emitting structure. The structure to be protected may be the exhaust pipe or manifold of an internal combustion engine whose side away from the engine is covered by the protective device 1 similar to that illustrated in FIGS. 15a and 15b.

The protective device 1, when developed, is in the shape of a flat body with a rectangular contour with two diagonally opposite corners 2 and 3 which are respectively provided with a coolant supply connection 4 and a coolant discharge connection 5, as may be seen in FIGS. 2a and 2b. The coolant supply connection 4 opens into a coolant distribution channel 6 which runs along one of the longitudinal edges of the protective devices and the discharge coolant connection 5 similarly communicates with a coolant distribution channel 7 running along the other of the longitudinal edges. A coolant chamber 8 is defined between the surfaces of the protective device and the chamber 8 opens into the distribution channels 6 and 7.

Figure 3B:
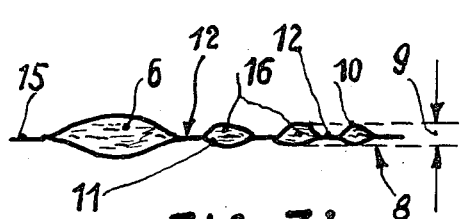
Figure 3C:
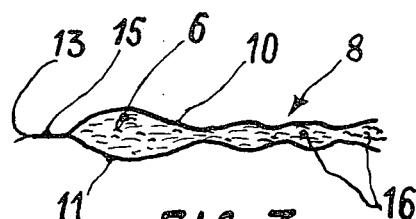
Figure 3D:
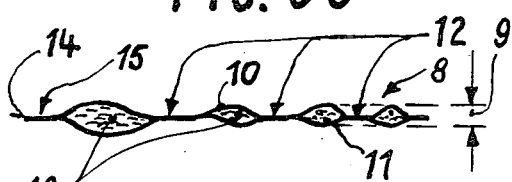

The protective device 1 consists substantially of two metal sheets 10 and 11 which are parallel to each other and spaced apart a short distance indicated at 9. The sheets 10 and 11 are supported against each other by bridging over the space 9 within the chamber 8. Each of the metal sheets 10 and 11 is provided with a pattern of round depressions or impressions which contact each other when the sheets are assembled to form a plurality of support points 12. The depressions are arranged opposite each other and preferably in a regular pattern such as shown in FIG. 3a in lines which run parallel to the longitudinal edges 13 of the protective device. Each of the depressions has a depth substantially one half of the space 9. The metal sheets 10 and 11 which abut at the support points 12 are connected together at the support points by spot welds, brazing or soldering, as may be seen in FIGS. 3b and 3d.

Figure 3E:
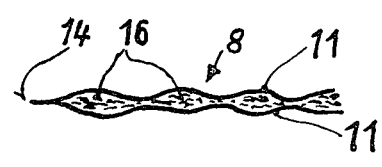

The mutually adjacent impressions of the metal sheets 10 and 11 overlap somewhat in the edge regions with the result that the space 9 between the metal sheets 10 and 11 is decreased in the region of the abovementioned lines along which the impressions are positioned between the depressions. Although in these regions the two metal sheets do not contact each other. The full space 9 thus exists only centrally of four impressions arranged in a square or rectangle as may be clearly see from FIGS. 3c and 3e.

While the depressions are arranged substantially in the shape of squares as shown in FIG. 3a, it is noted that these depressions forming the support points 12 can also be arranged in modifications of this pattern, such as for example, hexagons or diamonds.

The metal sheets 10 and 11 are sealingly connected along their side edges 13 and 14 by means of continuous weld seams of relatively closely positioned weld points 15. This connection can also be made by screws, bolts, rivets and other fastener devices. A suitable seal or packing can also be positioned between the metal sheets 10 and 11.

It is preferable that there are no impressions near the longitudinal edges 13 of the protective device along a wider edge region. Along this edge the metal sheets have a greater space therebetween and thus form the distribution channels 6 or 7 which extend along the longitudinal edges. The channels 6 and 7 open into the coolant connections 4 or 5 which are sealingly welded to the metal sheets 10 and 11. The other ends of the channels 6 or 7 are sealingly closed.

It can be seen from the structure as described above that a coolant chamber 16 is located between the metal sheets 10 and 11 and merges on the one hand into the distribution channel 6 through which coolant is supplied and, on the other hand, into the distribution channel 7 through which the coolant is conducted away. The coolant flows through the coolant chamber 16 in the manner shown by the lines 17 in FIG. 3a.

The protective device 1 can be fabricated by first welding the metal sheets 10 and 11 together in the planar state and then sealing along their edges at least up to the points of the connection openings and along the support points. A suitable fluid pressure medium is then introduced at high pressure through a connection opening and between the metal sheets 10 and 11 to force the sheets apart from each other with plastic deformation along those areas that are not welded together. In this manner, the distribution channels 6 and 7 and the coolant chamber 16 are formed into their shapes as described above. The protective device 1 may then be bent or deformed into its protective screen shape for a particular heat emitting structure.

According to the present invention the metal sheets 10 and 11 may be formed directly into their protective screen shapes and then welded together. Subsequently, the distribution channels and the coolant chambers are shaped by the introduction of a pressure medium. For particular applications, welding can be replaced by brazing or soldering. In both methods of fabrication, the outward forcing of the metal sheets by the fluid pressure medium can occur in a suitable mold which determines precisely the final shape of the protective device.

Figure 4B:
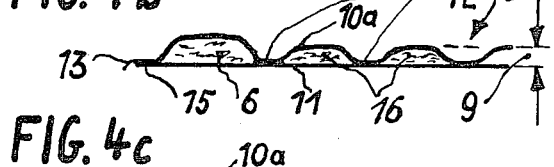
Figure 4C:
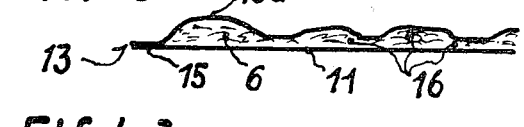
Figure 4D:
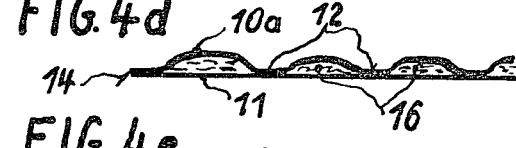
Figure 4E:
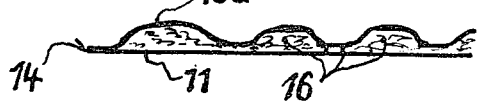
Figure 4A:
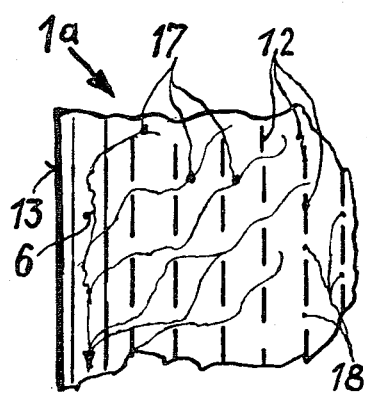
FIG. 4a is a view similar to that of FIG. 3a and showing a modification thereof.

Instead of spot welding, as illustrated in FIG. 3a, an uninterrupted roll-seam weld can also be employed. The location of the uninterrupted roll-seam weld at the support points 12 is shown in FIG. 4a. The seams are interrupted at 18 and may be arranged to alternate or, as shown on the right hand side of FIG. 4a, be offset relative to each other. The flow lines of the coolant are indicated by the lines 17.

The protective device according to FIGS. 4a-4e is preferably fabricated by using a preformed metal sheet 10a which has been embossed with creases or linear depressions with respect to the distribution channels 6 and 7 and the coolant chamber 16. The shaped metal sheet 10a is then positioned on the planar metal sheet 11 and welded to it as described above. However, it is also possible to use a pre-embossed metal sheet instead of the planar metal sheet 11 or, as described with respect to FIGS. 3a-3e to weld two planar sheet metal parts together and then force out the distribution channels 6 and 7 and the coolant chamber by introducing a fluid pressure medium between the metal sheets.

When two metal sheets having elongated or linear depressions or creases are used, the cooling action may be increased if the creases of the sheets are positioned at right angles to each other. This then provides multiple deflections of the coolant flow through the protective device.

In the protective devices of the present invention as disclosed herein, the metal sheets 10, 10a and 11 are preferably of sheet steel the surfaces of which may be treated against corrosion such as by galvanizing, cadmium plating and the like. In order to increase heat transfer by radiation, layers or coatings which increase the absorbtion can be arranged on the surface such as, for example, by roughening the surface, by applying special paints and coatings and the like. The exterior surface itself can be increased by the use of ribs or other projecting structures so as to increase the heat emission.

The protective device can also be made of stainless steel using screw or riveted connections since considerable problems are encountered in welding stainless steel. When aluminum metal sheets are used, the connections can be made by a roll bonding process in which the two superimposed aluminum metal sheets, at least one of which may be provided with a suitable parting agent, are rolled together at high temperature and under great force to connect the sheets at the desired places.

The numerous connection or supporting points of the two metal sheets in all of the embodiments and modifications of the present invention ensure high compression strength and rigidity of the protective device. The sizes and shapes of the channels or passages of the coolant chamber 16 can be determined by the spacing of the support points 12. A large surface area and channel-like construction of the coolant chamber 16 provides effective and intensive cooling.

Instead of the large radius curvatures of the protective screen provided in the structures according to FIGS. 1 and 2b, the protective device can also be shaped with a relatively sharp or square U-shape as shown in FIG. 5a. This protective device can also be fabricated in the manner as described above by bending the planar form of the screen along the lines 19. However, the protective device of FIG. 5a can also be formed from three substantially planar protective screens 20, 21, and 22 which are connected together along their edges 19 by welding, bolts, or screws, or other suitable fastening devices such that a coolant chamber 16 is formed which communicates through all three screen parts 20, 21, and 22. The distribution channels 6 and 7 run adjacent the two longitudinal edges 13.

It is conceivable that the sealed, continuous connection of the coolant chamber through the protective screen parts 20, 21, and 22, can give rise to certain problems or difficulties. To avoid these problems each protective screen part 20a, 21a, and 22a as seen in FIG. 6, can be provided with its own closed coolant chamber with its own distribution channel to connect the protective screen parts 20a, 21a and 22a along the edges 19 without the coolant chamber communicating therebetween. The individual coolant chambers of the three screen parts 20a, 21a and 22a are then connected to a coolant circuit by means of their own distribution channels 6 and 7 in a suitable manner, in parallel or in series with each other.

The metal sheets of the protective device may be supported against each other by the use of two slotted sheets 23 and 24 as shown in FIGS. 7a-17c. Sheet 24 is provided with a pattern of slots or elongated openings 26 and the sheet 23 is provided with similar elongated openings and slots 25. The sheets 23 and 24 are positioned so that their respective slots are at right angles to each other as seen in FIG. 7a so as to form continuous passages with multiple angles. The two slotted sheets 23 and 24 are covered on both sides by planar metal sheets 27 so that the sheets 27 project over the edges of the slotted sheets on one or on two opposite sides and these projecting edges are sealingly connected together at a distance from the slotted sheets through a rod-like spacing bar 28. The distribution channels, such as channel 6 shown at FIG. 7a is thus formed between the spacer bar 28 and the edges of the slotted sheets 23 and 24. The remaining side edges of the slotted sheets 23 and 24 and the metal sheets 27 are sealingly connected together with the closing of the slots 25 and 26. The metal sheets 27 and the slotted sheets 23 and 24 can be connected together by spot welds 29 in the surface area of the protective device.

Figure 8A:
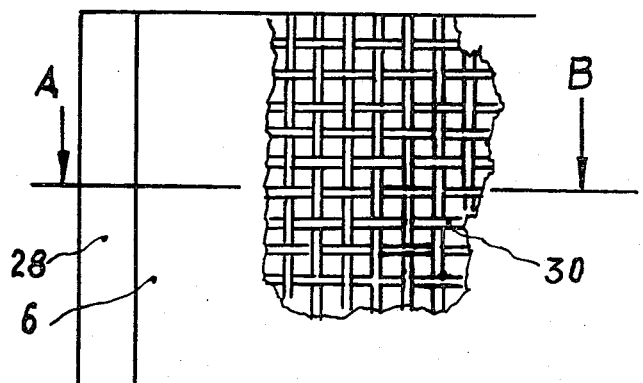
FIGS. 8a and 8b are similar to FIGS. 7a and 7b but of a fifth modification.
Figure 8B:
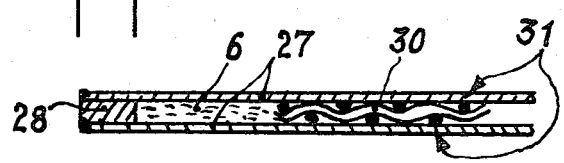

In the modification of the protective device, a wire fabric 30 is inserted between two planar metal sheets 27 as may be seen in FIGS. 8a and 8b. The two metal sheets 27 project outwardly beyond the wire fabric 30 at one or two opposite sides and are sealingly connected together by the similar use of a spacer rod or bar 28. In this manner, the distribution channel 6 is formed between the spacer bar 28 and the adjacent edge of the wire fabric 30. The metal sheets 27 are sealingly connected together at the remaining side edges. The metal sheets 27 are firmly fastened to the wire fabric 30 at individual abutment points such as at welds 31 but soldering or brazing can also be employed. Because of the interwoven structure of the wire fabric 30, the coolant is able to circulate throughout the wire fabric in its plane in the protective device. The circulating coolant is frequently deflected by the individual strands and thus provides effective and intensive cooling of the metal sheets 27.

Figure 9B:
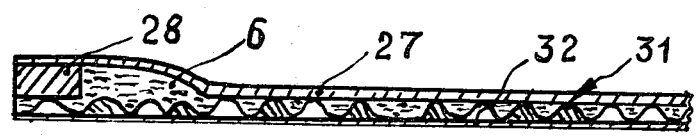
FIGS. 9a and 9b are similar to FIGS. 8a and 8b but of a sixth modification.
Figure 9A:
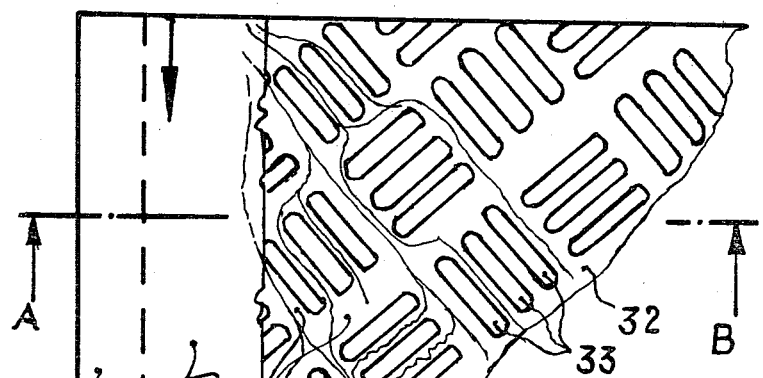

In the modification of FIG. 9a the protective device comprises a ribbed plate 32 upon which is fastened a planar metal sheet 27 by means of weld points 31 or by soldering. The plate 32 has a checkerboard pattern of short ribs 33 as shown in FIG. 9a so as to form a circulating channel for the coolant around and between the ribs as indicated by the thin flow lines positioned through the coolant chamber 16. Other arrangements and patterns of ribs 33 in the plate 32 may be employed. The planar metal sheet 27 is slightly bent upwardly near at least one edge as shown on the left side of FIG. 9b and the outer edge of sheet 27 is connected through a spacer bar 28 to the plate 32 to form the distribution channel 6. The remaining edges of the plate 32 and metal sheet 27 are also sealingly connected.

Figure 10:
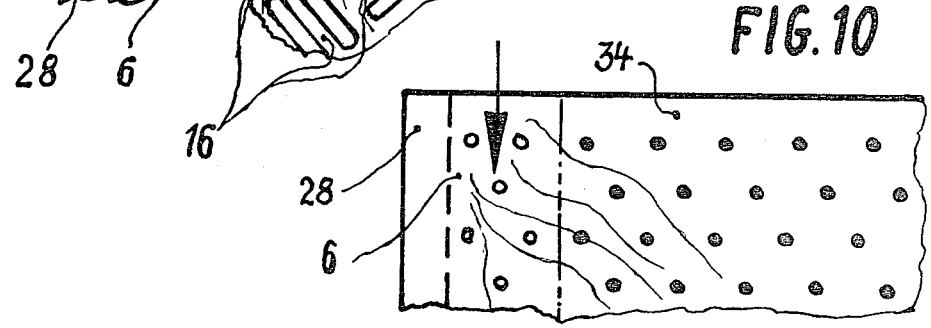
FIG. 10 is a view similar to FIG. 9a but of a seventh modification.

In the modification of FIG. 10, a sheet or plate 34 may be provided with a pattern of dimples or depressions instead of the ribbed plate 32. In a manner similar to that of FIGS. 9a and 9b a sheet 27 is attached to the plate 34 to form the protective device.

In the protective devices of the present invention as disclosed herein, it is not necessary that the coolant supply and discharge connections be diagonally opposed from each other but can be positioned in many other ways. One such arrangement is shown in FIG. 11 wherein distribution channels 6a and 7a are formed along a longitudinal edge 13a and are separated at approximately the center of the protective device by a suitable interruption or block 63 which may be formed in various ways. Thus, the channel 6a functions for receiving the supply of coolant and channel 7a functions to remove or discharge the coolant. Adjacent the interruption 63 the metal sheets of the protective device are connected together along line 64 which extends transversely of the longitudinal direction of the distribution channels 6a, 7a over a greater portion of the width of the protective device. As shown in FIG. 11, the connection 64 extends about two thirds of the width of the protective device. The support points 12 are preferably arranged with a mutual spacing which decreases with decreasing distance from the line 64. The coolant flowing in through the distribution channel 6a must flow in the surface region of the protective device adjacent to line 64, flow around the end of the line 64 remote from the distribution channel and then flow out through the protective device through the distribution channel 7a. The arrangement of the support points 12 with varying distances from each other, as shown in FIG. 11, provides a flow-resistance to the coolant within the protective device so as to provide a sufficient and uniform circulation of coolant throughout all portions of the coolant chamber. The line 64 may be formed by a weld or by opposed folds or creases in the sheets 27, which are suitably connected together such as by welding or soldering.

When the protective device is to have a U-shaped cross-section, the structure as illustrated in FIG. 12a could be employed. In this modification, a planar metal sheet 27 is positioned upon a corrugated metal plate 35 and the plate and sheet then connected together by spot or roller welding or soldering at their adjacent or opposed support points 12. The individual corrugations of the plate 35 thus form coolant chambers 16′ which consists of a plurality of parallel channels. Distribution channels 6 and 7, which have a rectangular cross-section, are positioned along the edges of the protective device at the sides which are at right angles to the longitudinal direction of the corrugations of the plate 35. The distribution channels 6 and 7 are curved into a U-shape corresponding to the cross-section of the protective screen and thus function to reinforce and stiffen the metal sheets 27 and 35 which are bent into the shape of a protective screen about the axis parallel to the longitudinal direction of the corrugations or the corrugated sheet 35. The coolant is supplied into the distribution channel 6, flows through the coolant chambers 16′ and flows out again through the distribution channel 7.

In place of rectangular distribution channels 6 and 7, round or elliptical section pipes or tubes can also be employed. The circulation of the coolant between the distribution channels in the individual coolant chambers 16′ can be facilitated by correspondingly dimensioned openings 36 in the wall of the distribution channels to function as flow throttles. In this manner the circulation of the coolant over the surface regions of the protective device can be adapted to the requirements at any time.

The protective device can also be formed into shapes other than the U-shaped cross-section as shown in FIG. 12a.

In FIG. 13a there is illustrated a protective screen according to the present invention which has a substantially Z-shaped cross-section and its longitudinal edges 13 are provided with multiple ends or curves. This protective screen is formed from a flat or planar element 37 as shown in FIG. 13b by bending the flat element along the bend lines 38. The element 37 of FIG. 13b can be formed by any of the procedures as described herein such as from two metal sheets or sheet elements together with the simultaneous formation of the distribution channels 6 and 7. In the event the coolant chamber is formed by forcing the parallel plates outwardly by introducing a pressure medium between the metal sheets, it is preferable to first form the flat element 37 into the Z-shape as shown in FIG. 13a.

A conical protective screen in the form of a jacket is shown in FIG. 14a, which is similarly formed from a double-walled planar body 37a, shown in developed form in FIG. 14b. In a similar manner the coolant chamber and the distribution channels 6 and 7 are formed as described above.

The elongated protective device 1 of the present invention having a U-shaped cross-section, is mounted upon an internal combustion engine 39 in such a manner as to enclose its exhaust manifold 40 at a predetermined space therefrom as shown in FIGS. 15a and 15b. The protective device 1 is screwed or bolted to the engine 39 or is fastened to the engine by means of tight metal bands which are not illustrated. In addition, the protective device 1 may also consist of several protective screen elements which are not shown in the drawings.

A conduit 43 is connected to a cooling water supply 42 of the engine 39 fed from a cooling water pump 41 to the cooling supply connection 4 of the protective device 1. The coolant discharge connection 5 is connected through a duct or pipe 44 to the cooling water return 45 of the engine 39 and passes back to the imput to the cooling water pump 41 through a by-pass or short circuited thermostat with deaeration and through a radiator 47 or a by-pass duct 48. It is thus apparent that the protective device 1 will absorb the radiative and convective heat emitted by the hot exhaust pipe and manifold 40 without itself being excessively heated and without additional cooling of the exhaust gasses. At the same time the protective device 1 provides a reliable protection against persons coming into contact with the high-temperature engine exhaust components.

The protective device 1 can also be inserted into the coolant circuit in parallel with the engine 39 as may be seen in FIG. 15a. It is also possible to arrange the engine 39 and the protective device 1 in series with the coolant circuit as shown in FIG. 16a. With both the parallel arrangements of 15a and the series arrangement of FIG. 16a of the engine 39 and protective device 1 in the coolant circuit, it may be expedient to provide an auxiliary coolant pump 49 with the protective device as shown in FIGS. 16b or 16c. The pump 49 will continue to run for a predetermined period of time after the engine 39 has been switched off and prevents formation of steam bubbles in the protective device 1 after switching off the engine until such a time as the exhaust manifold and pipe has sufficiently cooled.

The protective device as disclosed herein may also be employed for the enclosure of entire engines to provide both heat and sound insulation. In FIG. 17a an engine 50 which emits heat and sound is mounted on a base 51 and is enclosed by a protective device housing 52 which is substantially in the shape of a rectangular parallelogram but which also can be spherical, conical or cylindrical in shape. The wall of the protective enclosure 52 is shown in enlarged scale in FIG. 17b and comprises an inner shell 53 from which is spaced an outer shell 54 in parallel relationship thereto. A filling material 55, preferably a heat and sound insulating medium, is placed between the inner and outer shells. The inner and outer shells 53 and 54 are each constructed as a protective device with respective cooling chambers 16. The protective device of the inner shell 53 absorbs the heat radiated from the engine 50 and maintains the insulation 55 at lower temperatures which can be easily withstood by the insulation. The protective device forming the outer shell 54 maintains a very low temperature on the surface of the enclosure 52. With this arrangement it is preferable to provide at least one recooler for the coolants.

In view of the somewhat higher surface temperature of the casing 52 it is expedient to employ the protective device of the outer shell 54 also as the recooler for the coolant which is heated through its circulation in the protective device of the inner shell 53 as shown in FIG. 18a in order to produce a gravity circulation of the coolant. The protective device of the inner and outer shells 53 and 54 are connected together at their respective highest and lowest points by coolant channels 56 and 57. The coolant heated in the protective device of the inner shell 53 flows upwardly in this protective device and passes through the upper coolant channel 56 into the protective device of the outer shell and flows downwardly while being cooled to run back through the lower coolant channel 57 back to protective device of the inner shell 53. A coolant pump 57' can also be provided as shown in FIG. 18b in one or more of the coolant channels 57 for positive circulation of the coolant or to reinforce or assist in the circulation of the coolant.

With a positive circulation of the coolant it is possible to flow the coolant which has been cooled in the protective device of the outer shell 54 through a heat exchanger 59 located within the casing 52 and then into the protective device of the inner shell 53 as shown in FIG. 18c. The heat exchanger 59 also has air from the interior space 61 of the casing heated by the engine flown through it by a fan 60 so that this air and, accordingly, the inner space 61 of the casing is cooled.

In the structure of FIGS. 18a–18c a coolant circuit of the engine can also be connected to the protective device of the outer shell 54 to act as a radiator. A separate radiator for the engine coolant is then superfluous.

In order to provide for proper ventilation of the coolant chambers it is preferable to arrange the roof 62 of the enclosure with its parallel outer and inner shells inclined as shown in FIGS. 18a and 18c.

It should be borne in mind that a particular advantage of the casing or enclosure 52 in its various modifications is its excellent rigidity and strength because of the double-wall protective devices which form the inner and outer shells. In addition, this multiple sandwich construction provides efficient and effective sound insulation.

Thus it can be seen that the present invention has provided a protective device for heat emitting structures, particularly, exhaust pipes and exhaust manifolds of internal combustion engines which provides excellent protection against contact with these heated structures and at the same time is simple and inexpensive to construct and to install.

It will be understood that this invention is susceptible to modification in order to adapt it to different usages and conditions and, accordingly, it is desired to comprehend such modifications within this invention as may fall within the scope of the appended claims.

What is claimed is:

1. A protective device for an exhaust manifold of an internal combustion engine comprising a screen for mounting on the engine and adapted to be spaced from and so shaped to at least partially enclose an exhaust manifold, said screen comprising a pair of substantially parallel spaced metal sheets sealingly connected along their edges, at least one of said sheets having means thereon for bridging the space therebetween to support said sheets at a plurality of points with respect to each other so as to define at least one coolant chamber having interspaces through which a coolant fluid can flow, coolant supply and discharge connection means at an edge of said screen communicating with said coolant chamber, and at least one coolant channel along connected edges of said sheets and said channel communicates with at least one coolant connection and at least one coolant chamber.

2. A protective device as claimed in claim 1 wherein said support points are distributed upon the surfaces of said metal sheets.

3. A protective device as claimed in claim 2 wherein said support points comprise a plurality of rows of intermittent seam welds.

4. A protective device as claimed in claim 1 wherein at least one of said sheets has a plurality of depressions therein abutting the other of said sheets.

5. A protective device as claimed in claim 4 wherein said depressions are disposed in mutually parallel intermittent lines.

6. A protective device as claimed in claim 4 wherein the other of said sheets has similar depressions therein, the depressions on both sheets being elongated and intersecting each other at angles.

7. A protective device as claimed in claim 4 wherein said depressions comprise a plurality of ribs arranged in squares, the ribs in adjoining squares are at an angle to each other.

8. A protective device as claimed in claim 4 wherein said depressions comprise dimples.

9. A protective device as claimed in claim 4 wherein said depressions comprise corrugations.

10. A protective device as claimed in claim 1 wherein said bridging means comprises a pair of metal plates each having a plurality of slots therein, the slots in one plate being at an angle to and overlapping the slots in the other plate.

11. A protective device as claimed in claim 1 wherein said bridging means comprises a wire fabric.

12. A protective device as claimed in claim 11 with the edges of said fabric terminating short of the edges of said sheets, a spacer strip between the edges of said sheets and said edges being welded together.

13. A protective device as claimed in claim 1 and further comprising means in a junction between a coolant chamber and a coolant channel for throttling the flow of coolant therebetween.

14. A protective device as claimed in claim 13 and further comprising means interconnecting said metal sheets along a line passing substantially centrally through a coolant channel and transversely thereto, said line extending across a portion of the width of said screen.

15. A protective device as claimed in claim 9 wherein there is at least one coolant channel along connected edges of said sheet and said channel communicates with at least one coolant connection and at least one coolant chamber, said coolant channel being along an edge of said connected sheets transverse to said corrugations, said coolant channel being more rigid in its longitudinal direction than the sheets in the direction of the corrugations.

16. A protective device as claimed in claim 15 wherein the direction of maximum deformation of the metal sheets is in the direction of said corrugations.

17. A protective device as claimed in claim 1 wherein said screen is planar and a plurality of said planar screens are connected together to define an enclosing hood.

18. A protective device as claimed in claim 1 and further comprising means on a surface of at least one metal sheet away from the other metal sheet for increasing its heat transfer properties.

19. A protective device as claimed in claim 1 wherein at least two protective screens are spaced from each other and a heat insulating material is disposed therebetween.

20. A protective device as claimed in claim 19 and further comprising means for connecting the coolant chambers of each of said two spaced protective screens.

* * * * *